(12) United States Patent
Marks

(10) Patent No.: US 9,819,181 B2
(45) Date of Patent: Nov. 14, 2017

(54) DEVICE FOR INTRINSICALLY SAFE REDUNDANT CURRENT SUPPLY OF FIELD DEVICES

(71) Applicant: ABB Technology AG, Zurich (CH)

(72) Inventor: Frank Marks, Langenfeld (DE)

(73) Assignee: ABB SCHWEIZ AG, Baden (CH)

(*) Notice: Subject to any disclaimer, the term of this patent is extended or adjusted under 35 U.S.C. 154(b) by 297 days.

(21) Appl. No.: 14/816,076

(22) Filed: Aug. 3, 2015

(65) Prior Publication Data

US 2016/0043560 A1    Feb. 11, 2016

(30) Foreign Application Priority Data

Aug. 6, 2014   (DE) .................. 10 2014 011 723

(51) Int. Cl.
*H02J 1/10* (2006.01)
*H02J 1/04* (2006.01)
*H02H 9/00* (2006.01)

(52) U.S. Cl.
CPC . *H02J 1/10* (2013.01); *H02J 1/04* (2013.01)

(58) Field of Classification Search
CPC ...... H02J 1/10; H02J 1/04; H02J 4/00; H02M 1/32; H02H 9/00; H02H 9/008
See application file for complete search history.

(56) References Cited

U.S. PATENT DOCUMENTS

| 5,144,517 A | 9/1992 | Wieth |
| 5,694,283 A | 12/1997 | Huczko |
| 2004/0252428 A1 | 12/2004 | Junker et al. |

FOREIGN PATENT DOCUMENTS

| DE | 9421001 U1 | 2/1995 |
| DE | 19814097 C1 | 3/2000 |
| DE | 10135980 C1 | 4/2003 |
| DE | 10152653 A1 | 4/2003 |
| EP | 2605355 A1 | 6/2013 |

*Primary Examiner* — Robert Deberadinis
(74) *Attorney, Agent, or Firm* — Leydig, Voit & Mayer, Ltd.

(57) ABSTRACT

A device is provided for intrinsically safe redundant current supply of field devices with a common current-limiting resistor in the mesh of the field device and with redundant current supply units. A current sensor can be provided in the mesh of the field device, the output signal of which sensor is connected to devices for controlling current or active current limiting in the redundant current supply units.

11 Claims, 1 Drawing Sheet

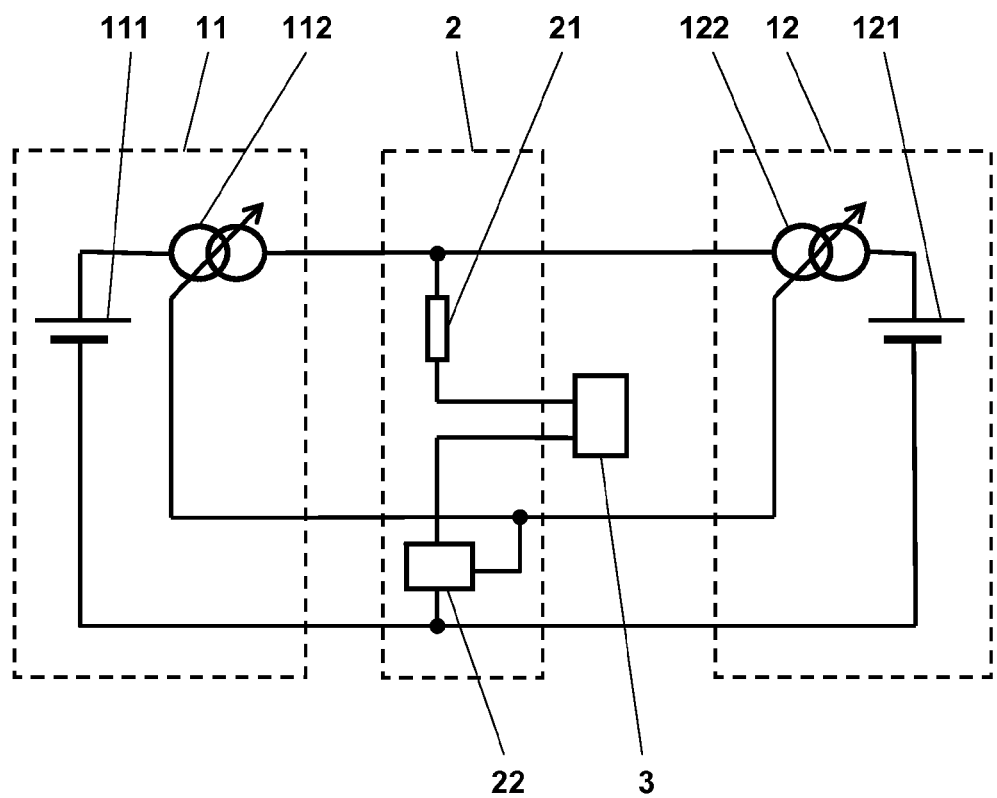

DEVICE FOR INTRINSICALLY SAFE REDUNDANT CURRENT SUPPLY OF FIELD DEVICES

CROSS-REFERENCE TO RELATED APPLICATIONS

Priority is claimed to German Patent Application No. DE 10 2014 011 723.5, filed on Aug. 6, 2014, the entire disclosure of which is hereby incorporated by reference herein.

FIELD

The invention relates to the intrinsically safe redundant current supply of field devices in automation engineering in an explosion-protected area.

BACKGROUND

A generic device has at least two supply circuits for providing the power/voltage supply and a protective device for intrinsically safe power limiting of the current supplied by the supply circuits to the consumer in the explosion-protected area, wherein the supply circuits as part of the protective device each have devices for controlling and/or limiting current.

Such devices are known and are used in installations in which parts of the operating means are operated in the explosion-protected area. The supply devices may be integrated in input/output components and are considered to be a link between an external arithmetic unit of a programmable logic controller and sensors and/or actuators in the explosion-protected area.

Operating means in plant sections which have been declared to be explosion-protected areas must meet particular requirements which are set out in European Standard EN 500 20. One option mentioned in EN 500 20 for operating operating means in the area at risk of explosion is so-called "intrinsic safety". In this connection, the supplied energy is limited such that no incendive spark can occur. In order to limit the energy, both current and power must be limited. The options for realizing this specifically are likewise regulated by EN 500 20.

In relation to the area at risk of explosion, differentiation into so-called zones is usual in Europe. In this case, a distinction is made between zone 0, zone 1 and zone 2, wherein the most stringent requirements exist for zone 0 since a permanently explosive atmosphere is assumed in this case. In this area, only resistive limiting of the current is permitted. Therefore, only resistors are allowed but no electronic limiters for the current. That is to say that, in the case of an input/output component in which a current is intended to be conducted in the explosion-protected area in zone 0, said current must be limited by one or more resistors, wherein the resistor or resistors must likewise meet particular preconditions.

The functionality or availability of input/output components can also significantly increase in the explosion-protected area if said input/output components are redundantly supplied. That is to say the circuit in the explosion-protected area (zone 0, 1 or 2), which is also referred to as field circuit, is connected to at least two supply circuits having the same function, wherein one supply circuit is active and the other supply circuit is on standby. If a fault occurs in the active device, it is possible to automatically change over to the second device without significant disturbances occurring in the process.

Additionally, in the case of a redundant supply such as this of input/output components in the explosion-protected area, the respective safety requirements must, of course, be met, for example the safety level of the "intrinsic safety". The intrinsically safety can be maintained, for example, by a changeover being effected between the two supply circuits such that in each case only one supply circuit is connected to the explosion-protected area. In order that an erroneous parallel connection of the two supply circuits, in the case of which the "intrinsic safety" would no longer be ensured owing to the addition of the currents of the two modules, does not occur there is a safety requirement on the changeover device used in the case of this implementation.

As a result of this, additional components are required, which is associated with an increase in complexity in terms of construction and an increase in costs. The device for redundant power/voltage supply itself can be configured such that it may be used at least in zone 1 or zone 2.

A connection unit for electrically coupling redundant assemblies to external communications interfaces is known from German utility model DE 94 21 001 U1, which external communications interfaces consist of parallel-connected plug-on-type units which are designed to receive current-limiting switching means.

Furthermore, an arrangement for connecting field devices arranged decentrally and in the immediate vicinity of the process to a remote central device is known from DE 101 35 980 C1, which central device has a plug unit that determines the configuration and is suitable for redundant connection of input/output assemblies and can have a current-limiting resistor in the event of a parallel connection.

What is common to the two known devices is that, although the common current-limiting resistor limits the current in the field circuit to permissible values in the event of a redundant connection of input/output assemblies, in the event of a failure of one of the redundant assemblies the required supply current strength for operating the connected field device is no longer provided for all application cases, however.

Moreover, an arrangement for redundant voltage supply of two-wire measuring transducers is known from DE 198 14 097 C1, in the case of which the redundant measuring transducer supply units are decoupled from one another by means of diodes and in each case only one measuring transducer supply unit supplies the two-wire measuring transducer while the respective other measuring transducer supply unit is operated in a function monitoring mode. What is disadvantageous is the necessary changeover procedure, in the event of failure of the supplying measuring transducer supply unit, to the redundant measuring transducer supply unit.

Finally, in the case of redundant supply of the connected field device via a common singular current-limiting resistor, it should be noted that the loop current in the supply circuit, even in the case of redundant current supply, is to be limited to permissible values and that the power loss via the singular current-limiting resistor in the redundant current supply device in the permissible short-circuit case in the field-device-side conductor loop leads to an impermissible overloading of the resistive current limiter in the current supply device.

SUMMARY

An aspect of the invention provides a device for intrinsically safe redundant current supply of a field device, the device comprising: a common current-limiting resistor in a mesh of the field device; redundant current supply units; and a current sensor, provided in the mesh of the field device, wherein an output signal of the current sensor is connected to at least one first device configured to control current or at least one second device configured to limit active current in the redundant current supply units.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a device for intrinsically safe redundant current supply of field devices.

DETAILED DESCRIPTION

An aspect of the invention provides a protective circuit arrangement for redundantly supplied field devices, which arrangement protects itself from overloading.

An aspect of the invention proceeds from a device for intrinsically safe redundant current supply of field devices with a common current-limiting resistor in the mesh of the field device.

According to an aspect of the invention, a current sensor is provided in the mesh of the field device, the output signal of which sensor is connected to devices for controlling current or active current limiting in the two redundant current supply units.

The mesh current, acquired using the current sensor, of the field circuit is identical to the total current of the partial currents supplied by the redundant current supplies, independently of the individual current strengths thereof.

As soon as the mesh current of the field circuit reaches the permissible limit value, the devices for controlling current or active current limiting in the two redundant current supply units respectively limit the individual output current of the respective current supply unit. In this case, the power loss is divided among the current-limiting resistor and the devices for controlling current or active current limiting in the two redundant current supply units. Accordingly, a design which can be housed in a miniaturized housing is permissible for the current-limiting resistor.

The location of the current sensor in the current loop can advantageously be freely selected.

In an advantageous development of the invention, the current sensor is designed in analogous input assemblies to acquire the measured value transferred by the field device as imprinted current. As a result, separate means for acquiring the measured value received and transferred by the field device can be dispensed with.

In a development of the invention, the current sensor is embodied as a diode in the forward direction. The forward voltage of the diode is therefore a measure for the mesh current of the field circuit. The forward voltage of the diode reduces the voltage drop across the current-limiting resistor and discharges same when the permissible limit value of the mesh current of the field circuit is reached.

In an alternative development of the invention, the current sensor is embodied as a resistor. In this case, the sensor resistor forms a resistor network with the current-limiting resistor, which resistor network can be used for other functions. The sum of the current-limiting resistor and the sensor resistor limits the current. The power loss is divided between the sensor resistor, the current-limiting resistor and the devices for controlling current or active current-limiting in the two redundant current supply units.

The invention is explained in more detail below on the basis of an exemplary embodiment. The single FIGURE illustrates a device for intrinsically safe redundant current supply of field devices 3 which consists of at least two identical current supply units 11 and 12 and a connection circuit 2.

Each current supply unit 11 and 12 has a voltage source 111 and 121 and a current controller/an active current limiter 112 and 122. The current supply units 11 and 12 are connected on the output side to the connection circuit 2 and are electrically connected in parallel.

The connection circuit 2 has the current-limiting resistor 21, a current sensor 22 and connection means for the connection of a field device 3. The current sensor 22 of the connection circuit 2 is connected to the current controller/the active current limiter 112 and 122 of each current supply unit 11 and 12.

Each current controller/each active current limiter 112 and 122 has a measuring amplifier, in which the measured value of the current sensor 22 is compared with a reference value. In the case of a positive control deviation, when the measured current value is greater than the reference value, the current controller/the active current limiter 112 and 122 reduces its output current and hence the loop current.

In the case of a negative control deviation, when the measured current value is less than the reference value, the current controller/the active current limiter 112 and 122 disconnects. Such a function is achieved using a degenerative operational amplifier with a diode in the feedback branch to the reference voltage.

The voltage drop across the diode is negligible in terms of energy in the normal operating state since this reduces the inevitable voltage drop across the current-limiting resistor 21.

In an advantageous configuration of the invention, the connection circuit 2 is designed as configuration-determining plug unit according to DE 101 35 980 C1, which allows both singular and redundant supply of the same field device 3.

Further embodiments may use other suitable current sensors.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS

11, 12 current supply unit
111, 121 voltage source
112, 122 current controller/active current limiter
2 connection circuit
21 current-limiting resistor
22 current sensor
3 field device

The invention claimed is:

1. A device for intrinsically safe redundant current supply of a field device, the device comprising:
   a common current-limiting resistor in a mesh of the field device;
   redundant current supply units; and
   a current sensor, provided in the mesh of the field device, wherein an output signal of the current sensor is connected to at least one first device configured to control current or at least one second device configured to limit active current in the redundant current supply units.

2. The device of claim 1, wherein the current sensor is configured in analog input assemblies to acquire the measured value transferred by the field device as imprinted current.

3. The device of claim 1, wherein the current sensor includes a diode in a forward direction.

4. The device of claim 1, wherein the current sensor includes a resistor.

5. The device of claim 1, wherein the current sensor to connected to at least one first device configured to control current.

6. The device of claim 1, wherein the current sensor to connected to at least one second device configured to limit active current.

7. The device of claim 1, wherein the current sensor to connected to at least one first device configured to control current and at least one second device configured to limit active current.

8. The device of claim 2, wherein the current sensor includes a diode in a forward direction.

9. The device of claim 2, wherein the current sensor includes a resistor.

10. The device of claim 1, wherein the current sensor is a diode in a forward direction.

11. The device of claim 1, wherein the current sensor is a resistor.

* * * * *